US012093862B2

(12) United States Patent
Hampton et al.

(10) Patent No.: US 12,093,862 B2
(45) Date of Patent: Sep. 17, 2024

(54) EVENT COST VISUALIZATION FOR ASSET CONDITION MONITORING

(71) Applicant: Baker Hughes Holdings LLC, Houston, TX (US)

(72) Inventors: Aaron Hampton, Houston, TX (US); Amir Datoo, Houston, TX (US); Jason Apps, Houston, TX (US); Adam Brumby, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 124 days.

(21) Appl. No.: 17/705,268

(22) Filed: Mar. 25, 2022

(65) Prior Publication Data
US 2023/0306330 A1    Sep. 28, 2023

(51) Int. Cl.
*G06Q 10/0631* (2023.01)
*G06F 3/0482* (2013.01)
*G06F 3/0484* (2022.01)

(52) U.S. Cl.
CPC ..... *G06Q 10/06313* (2013.01); *G06F 3/0482* (2013.01); *G06F 3/0484* (2013.01); *G06F 2203/04803* (2013.01)

(58) Field of Classification Search
CPC .............................................. G06Q 10/06313
See application file for complete search history.

(56) References Cited

U.S. PATENT DOCUMENTS

| | | | | |
|---|---|---|---|---|
| 11,210,278 | B1* | 12/2021 | Dean | G06F 16/2453 |
| 2002/0068559 | A1* | 6/2002 | Sharma | H04W 24/00 |
| | | | | 455/425 |
| 2002/0077944 | A1* | 6/2002 | Bly | G06Q 10/06 |
| | | | | 705/35 |
| 2003/0225707 | A1* | 12/2003 | Ehrman | H04L 9/40 |
| | | | | 705/64 |
| 2004/0243636 | A1* | 12/2004 | Hasiewicz | G05B 23/0251 |

(Continued)

OTHER PUBLICATIONS

Motamedi et al, Knowledge-assisted BIM-based visual analytics for failure root cause detection in facilities management, Automation in Construction 43 (2014) 73-83 (Year: 2014).*

(Continued)

*Primary Examiner* — Andre D Boyce
(74) *Attorney, Agent, or Firm* — Mintz, Levin, Cohn, Ferris, Glovsky and Popeo, P.C.

(57) ABSTRACT

An asset management system is provided and includes a memory and an event analyzer. The memory maintains event data and at least one cost. The event data characterizes events experienced by assets distributed among sites of a fleet. The event data include an asset location within an asset hierarchy of the fleet and event parameters corresponding to the event. Costs can be correlated to respective events. The analyzer generates a GUI displaying a first window hierarchically listing of assets organized by their hierarchical position within the fleet. The analyzer receives, via the GUI, a user selection of a hierarchical level within the hierarchical list, and identifies events associated with the selected hierarchical level. The analyzer updates the GUI to display a second window in response to receipt of the user selection. The second window lists the identified events, with corresponding event data costs.

14 Claims, 8 Drawing Sheets

(56) References Cited

U.S. PATENT DOCUMENTS

| | | | | |
|---|---|---|---|---|
| 2007/0095906 | A1* | 5/2007 | Camilleri | G06Q 10/087 |
| | | | | 235/385 |
| 2008/0015955 | A1* | 1/2008 | Ehrman | G06Q 30/02 |
| | | | | 705/28 |
| 2009/0099898 | A1* | 4/2009 | Ehrman | G06Q 10/06 |
| | | | | 705/7.15 |
| 2010/0228428 | A1* | 9/2010 | Harshbarger | B66F 17/003 |
| | | | | 701/31.4 |
| 2014/0089031 | A1* | 3/2014 | Bell | G06Q 10/06315 |
| | | | | 705/7.23 |
| 2014/0209676 | A1* | 7/2014 | Reynolds | G06K 19/0723 |
| | | | | 235/385 |
| 2016/0307155 | A1* | 10/2016 | Bell | G06Q 10/08 |
| 2016/0335731 | A1* | 11/2016 | Hall | G06Q 10/067 |
| 2017/0192628 | A1* | 7/2017 | O'Connor | H04L 63/18 |
| 2018/0276909 | A1* | 9/2018 | Harshbarger | G07C 5/008 |
| 2019/0101898 | A1* | 4/2019 | Middendorf | G06Q 10/06313 |
| 2020/0241490 | A1* | 7/2020 | Jermann | G06F 9/54 |
| 2022/0230125 | A1* | 7/2022 | Vedantam | G06Q 10/063114 |

OTHER PUBLICATIONS

Abdi et al, Sustainable asset management: A repair-replacement decision model considering environmental impacts, maintenance quality, and risk, Computers & Industrial Engineering 136 (2019) 117-134 (Year: 2019).*

* cited by examiner

EVENT COST VISUALIZATION FOR ASSET CONDITION MONITORING

BACKGROUND

Many industries, such as hydrocarbon extraction, refining, and power generation, can rely heavily upon operation of assets (e.g., machinery), and in some instances, continuous operation of such assets. In these environments, unplanned asset shutdown and/or failure can incur severe consequences, ranging from expenses due to loss of production and/or expenses, to potential injury to workers, amongst others. Given these risks, it can be common to monitor selected parameters of various assets during operation.

In one aspect, condition monitoring of an asset can include measurement and/or analysis of one or more operating parameters of the asset. These measurements and analysis of the measurements, alone or in combination, can provide an indication of the condition of a respective asset components, as well as the asset as a whole. As a result, deviations in asset operation from normal operation can be identified and addressed to avoid asset shutdown and/or failure. Accordingly, asset condition monitoring can provide a variety of long term benefits, such as lower production costs, reduced equipment down time, improved reliability, and enhanced safety.

SUMMARY

Condition monitoring systems can be configured to report a variety of events characterizing deviation in asset performance from pre-determined normal operation conditions. As an example, set points can be used to define a normal operation range and measurement of operating parameters outside of this range can be flagged as an event. Conventionally, events can be displayed and prioritized based upon a severity of the event and/or criticality of the monitored asset.

While display of events in this manner can be beneficial, existing categories of event severity and asset criticality can be limited. For example, event severity and asset criticality are typically categorized on a numerical scale (e.g., 1-4). However, it can be difficult for an operator of a condition monitoring system to correctly prioritize two or more events based solely on such numerical scales. For example, consider the cases where two events have the same severity or criticality, prioritization can be highly subjective, relying primarily upon the operator's judgement, rather than more objective criteria. This problem similarly arises under the circumstance where, of two events, a first event has a severity higher than a second event, while the second event has a higher asset criticality than the first event. These difficulties are further compounded, and arise more frequently, as the number of recorded events and the number of monitored assets increase.

Accordingly, embodiments of the present disclosure provide improved systems and methods for asset management providing condition monitoring that correlates respective events with costs (e.g., an amount of currency). In general, a variety of considerations can be represented as a cost, whether or not they have an actual financial cost. For example, costs can be developed using reliability models (e.g., developed from failure modes and effects analysis (FMEA)). Events and corresponding costs can be presented together in a graphical user interface for viewing by an operator of the condition monitoring system.

The ability to visualize events and corresponding costs together represents a significant improvement over visualization of event information alone. Notably, viewing an event with a corresponding cost can significantly improve an operator's understanding of the impact of the event, as compared to numerical scales for event severity and asset criticality. The cost provides a common basis upon which to evaluate the impact of respective events. Thus, barring other considerations, an operator can readily prioritize events according to the magnitude of their respective costs. Furthermore, this approach can remove a significant degree of subjectivity from event prioritization, allowing prioritization decisions to be made more rapidly and reducing the likelihood of making incorrect prioritization decision.

In an embodiment, an asset management system is provided. The system can include a memory and an event analyzer including one or more processors. The memory can be configured to maintain a plurality of event data and at least one cost. The plurality of event data can characterize one or more events experienced by respective assets of a plurality of assets, where the plurality of assets can be distributed among different sites of a fleet. The event data can includes at least a location of the asset within an asset hierarchy of the fleet and at least one event parameter corresponding to the event. The at least one cost can correspond to respective ones of the one or more events. The event analyzer can be configured to receive the plurality of event data and the at least one cost, and to perform a variety of operations. In one aspect, the operations can include generating a graphical user interface (GUI) displaying a first window. The first window can include a hierarchical list of assets organized according to their position within the asset hierarchy of the fleet. In another aspect, the operations can include receiving, via the GUI, a first user selection of a hierarchical level within the hierarchical list. In a further aspect, the operations can include identifying at least one event from the one or more events maintained by the memory that is associated with the hierarchical level of the first user selection. In an additional aspect, the operations can include updating the GUI to display a second window in response to receipt of the first user selection. The second window can include a list having respective entries for the identified at least one event, and an entry for an event can include at least a portion of the event data and the at least one cost corresponding to that event.

In another embodiment, the memory can further include at least one cause corresponding to respective ones of the one or more events.

In another embodiment, the at least one cost can include a plurality of costs, and a respective cause of the at least one cause can corresponds to a respective cost of the plurality of costs.

In another embodiment, the at least one cost displayed in the second window for an event of the identified at least one event can be a highest cost of the plurality of costs for that event.

In another embodiment, the at least one cost displayed in the second window for an event of the identified at least one event can be an average of the plurality of costs for that event.

In another embodiment, the event analyzer can be further configured to receive, via the GUI, a second user selection of an event from the list within in the second window. The event analyzer can be additionally configured to identify the at least one cause corresponding to the selected event. The event analyzer can also be configured to update the GUI to display at least one third window in response to receipt of the second user selection. The third window can include a list having respective entries for the identified at least one cause and its corresponding cost.

In another embodiment, the memory can further include a plurality of recommendations and a respective recommendation of the plurality of recommendations corresponds to a respective cause of the at least one cause. The event analyzer is further configured to update the GUI to include the recommendation corresponding to the identified at least one cause within the third window.

In another embodiment, the asset hierarchy of the fleet can include two or more of a fleet level, a site level, an asset group level, or an asset level.

In another embodiment, the at least one event parameter can include at least one of a measurement type, a measurement point, an event type, an event level, an event source, or an asset state.

In another embodiment, the one or more events can include at least one of an alarm, a condition monitoring system health event, an instrument health event, or an analytical health event.

In an embodiment, a method of asset management is provided. The method can include maintaining, by a memory, a plurality of event data and at least one cost. The plurality of event can include data characterizing one or more events experienced by respective assets of a plurality of assets, wherein the plurality of assets are distributed among different sites of a fleet. The event data can include at least a location of the asset within an asset hierarchy of the fleet and at least one event parameter corresponding to the event. The at least one cost can corresponding to respective ones of the one or more events. The method can also include receiving, by an event analyzer including one or more processors, the plurality of event data and the at least one cost. The method can additionally include generating, by the event analyzer, a graphical user interface (GUI) displaying a first window. The first window can include a hierarchical list of assets organized according to their position within the asset hierarchy of the fleet. The method can additionally include receiving, by the event analyzer, via the GUI, a first user selection of a hierarchical level within the hierarchical list. The method can also include identifying, by the event analyzer, at least one event from the one or more events maintained by the memory that is associated with the hierarchical level of the first user selection. The method can further include updating, by the event analyzer, the GUI to display a second window in response to receipt of the first user selection. The second window can include a list having respective entries for the identified at least one event and an entry for an event can include at least a portion of the event data and the at least one cost corresponding to that event.

In another embodiment, the method can further include maintaining, by the memory, at least one cause corresponding to respective ones of the one or more events.

In another embodiment, the at least one cost can include a plurality of costs, and a respective cause of the at least one cause can correspond to a respective cost of the plurality of costs.

In another embodiment, the at least one cost displayed in the second window for an event of the identified at least one event can be a highest cost of the plurality of costs for that event.

In another embodiment, the at least one cost displayed in the second window for an event of the identified at least one event can be an average of the plurality of costs for that event.

In another embodiment, the method can include further operations performed by the event analyzer. In one aspect, the operations can include receiving, via the GUI, a second user selection of an event from the list within in the second window. In another aspect, the operations can include identifying the at least one cause corresponding to the selected event. In a further aspect, the operations can include updating the GUI to display at least one third window in response to receipt of the second user selection. The third window can include a list having respective entries for the identified at least one cause and its corresponding cost.

In another embodiment, the method can further include maintaining, by the memory, a plurality of recommendations and a respective recommendation of the plurality of recommendations corresponds to a respective cause of the at least one cause. The event analyzer can further update the GUI to include the recommendation corresponding to the identified at least one cause within the third window.

In another embodiment, the asset hierarchy of the fleet can include two or more of a fleet level, a site level, an asset group level, or an asset level.

In another embodiment, the at least one event parameter can include at least one of a measurement type, a measurement point, an event type, an event level, an event source, or an asset state.

In another embodiment, the one or more events can include at least one of an alarm, a condition monitoring system health event, an instrument health event, or an analytical health event.

BRIEF DESCRIPTION OF THE DRAWINGS

These and other features will be more readily understood from the following detailed description taken in conjunction with the accompanying drawings, in which.

Figure 1:
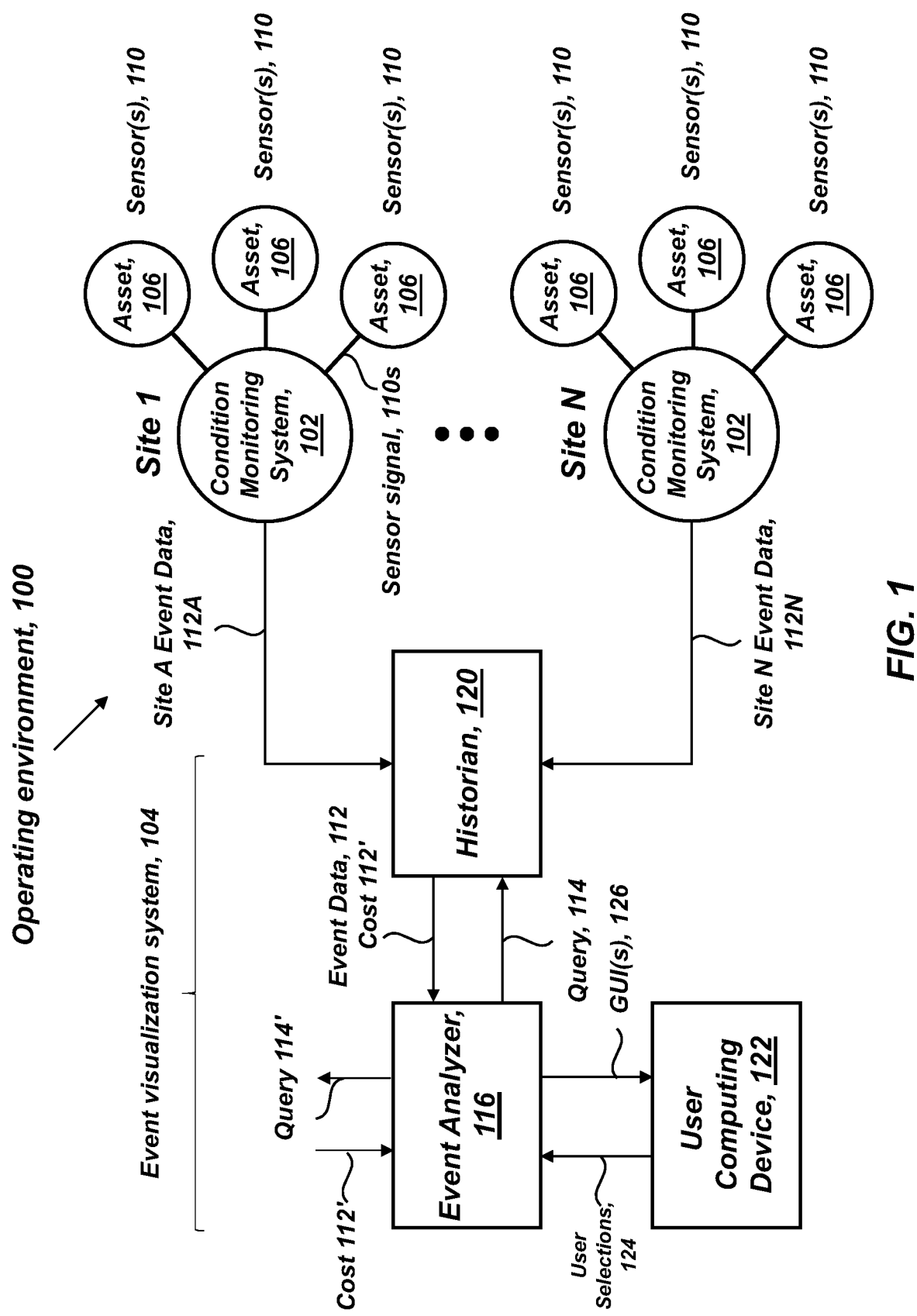
FIG. 1 is a schematic diagram illustrating one exemplary embodiment of an operating environment including an improved visualization system for condition monitoring of an asset including an event analyzer.

It is noted that the drawings are not necessarily to scale. The drawings are intended to depict only typical aspects of the subject matter disclosed herein, and therefore should not be considered as limiting the scope of the disclosure.

DETAILED DESCRIPTION

Assets (e.g., machines, machine components, etc.) can be monitored by one or more sensors to ensure they are operating properly. Condition monitoring systems can be used to review sensor measurements, detect when an asset is operating abnormally, and determine whether or not to log an event (e.g., an alarm). Logged events can be reviewed by operating engineers to determine whether action should be taken regarding an event (e.g., shutdown, scheduling maintenance, etc.) Existing condition monitoring systems can present events as a list. However, under some circumstances (e.g., when an asset shifts repeatedly between operating normally and abnormally), similar events can be logged repeatedly. As a result, event logs can become filled with more events than are necessary for an operator to efficiently analyze the cause triggering the event. Furthermore, it can be difficult to find unique events responsible for triggering the event. Additionally, it can also be challenging to prioritize events for attention.

Accordingly, improved systems and methods for visualizing events for asset condition monitoring are provided. In one aspect, event data from multiple condition monitoring systems can be displayed. This represents an improvement over existing condition monitoring systems that are designed to only visualize event data acquired at their local site. In another aspect, events can be reviewed and classified as either being unique or repeated. When displaying events for viewing by an operator, unique events can be displayed as a single item and repeated events can be aggregated into a single item. The ability to aggregate repeated events can improve the efficiency of operators employing the event visualization system, as repeated events can be reviewed together without the need for additional searching. Alternatively or additionally, in a further aspect, a cost corresponding to respective events can be displayed. The ability to view the cost of an event, along with the event itself, can further improve the efficiency of operators employing the event visualization system, as events can be often be prioritized quickly on the basis of cost, without the need for more time-consuming evaluation.

A displayed event can be selected to view further details regarding the event, facilitating ease of review. In contrast, existing condition monitoring systems can lack the ability to obtain and display such detailed event data and/or the cost of event causes concurrently in a single graphical user interface.

Embodiments of systems and corresponding methods for visualization of events and corresponding costs for condition monitoring are discussed herein. However, embodiments of the disclosure can be employed to for visualization of other data without limit.

FIG. 1 is a schematic diagram illustrating one exemplary embodiment of an operating environment 100 including one or more condition monitoring systems 102 in communication with an event visualization system 104. As shown, a plurality condition monitoring systems 102 are provided, each present at a respective site (e.g., Site 1, Site 2, ... Site N) including one or more assets 106.

Embodiments of the assets 106 can include any machine or machine component for which monitoring is desired. In certain embodiments, the assets 106 can be machines including rotating components, reciprocating components, and/or fixed asset components. Such components can include, but are not limited to, gears, bearings, and shafts, amongst others. Examples of machines containing such components can include, but are not limited to, turbomachines, turbines (e.g., hydro, wind), generators, and reciprocating compressors, amongst others.

As discussed in greater detail below, the assets 106 can be arranged in an asset hierarchy including a plurality of levels. The lowest level of the asset hierarchy can be the asset components. The next level up from asset components can be the asset level, which encompasses all of the components of a respective asset. As an example, for a recycle compressor asset, asset components can include a motor, a gearbox, and a compressor. The next level up from assets 106 can be the asset group level. Assets 106 can be grouped according to any predetermined criteria, such as functionality or process. In one example, a hydrocracker asset group can include respective assets 106 such as a recycle compressor, a make-up compressor, and a charge pump. The next level up from asset groups can be the site level, which can include all assets associated with a site. As an example, a refinery site can include asset groups such as alkylation, atmospheric distillation, coker, fluidic catalytic cracking, hydrocracker, reformer, and vacuum distillation. The final level up from sites can be the fleet level, which includes all assets 106 at all sites. It can be appreciated that the examples above are provided for illustration and that the asset hierarchy can include any number of levels, as necessary.

Each of the condition monitoring systems 102 can be in communication with respective sensors 110 that are configured to sense one or more operating parameters of a target one of the assets 106. The sensors 110 can be further configured to generate at least one sensor signal 110s representing the measured operating parameter, and to transmit sensor signals 110s to a respective condition monitoring system 102 (e.g., via field wiring). As an example, the sensors 110 can include a probe, a transducer, and a signal conditioning circuit (not shown). The probe can interact with the asset 106 for measurement of the operating parameter. The transducer can convert measurements of the operating parameter into an electrical signal (e.g., a voltage), and the signal conditioning circuit can condition and/or amplify the electrical signal to generate the sensor signals 110s (e.g., a voltage ranging between a minimum and maximum). Thus, in one aspect, the sensor signals 110s can contain the direct or raw measurement made by the sensor transducer. The sensor signals 110s can be an analog signal or a digital signal.

In another aspect, the sensor signals 110s can include information in addition to the direct measurements of an operating parameter. As an example, the sensor signals 110s can include metadata regarding one or more components of the corresponding sensors 110, such as the transducer. Examples of metadata can include, but is not limited to, one or more of a serial number, revision number, operating temperature, and state of health.

The number and type of sensors 110 can be dictated by the operating parameter(s) that are intended to be measured. In one aspect, the sensors 110 can take the form of one or more proximity probes for measurement of vibration, position, speed, direction of motion, and eccentricity. In another aspect, the sensors 110 can take the form of one or more accelerometers for measurement of seismic vibration and acceleration. In a further aspect, the sensors 110 can take the form of one or more temperature probes or pressure probes for measurement of temperature and pressure, respectively. It can be understood that the types of sensors 110 and corresponding measured operating parameters discussed above are not exhaustive and embodiments of the sensors 110 can include any sensor or combination of sensors suitable for measurement of operating parameters of interest.

In use, the condition monitoring system 102 can be configured to analyze the received sensor signals 110s and identify events regarding the corresponding monitored assets 106. As an example, the condition monitoring system 102 can be configured to determine a value characterizing an operating parameter measurement. The condition monitoring system 102 can also be configured to compare determined values to one or more corresponding predetermined set points or other conditions (e.g., alarm conditions) to determine an alarm status (e.g., OK, Not OK, over, under, etc.) As an example, OK/Not OK can represent a pass/fail condition, while over/under can represent measurement of one or more operating parameters over a set point or under a set point respectively.

For instance, when the asset 106 is a rotating shaft and the measured operating parameter is radial vibration of the shaft, the sensor signal 110s can include measurements of displacement of the shaft as a function of time. From the sensor signals 110s, the condition monitoring system 102 can determine the value of vibration amplitude from the peak-to-peak displacement. Under circumstances where the alarm status indicates operation of the asset 106 outside of a normal operating range, the condition monitoring system 102 can log the alarm as an event.

In further embodiments, the condition monitoring system 102 can be configured to analyze operational parameters received from multiple sensors 110 using defined logic and/or models to extract advanced insights of asset fault conditions. These operational parameters can be measured from a single component/asset or multiple components/assets.

The condition monitoring system 102 can be further configured to perform monitoring of in a similar fashion upon itself. The additional monitoring can be grouped into a variety of categories and can include, but is not limited to, system health, instrument health, and analytical health.

System health can include the health of any aspect of the hardware and/or software supporting the functionality of the condition monitoring system 102. The condition monitoring system 102 can receive data from its software/hardware and employ this data in conjunction with set points or other programmed logic to determine whether a system health event has occurred and should be logged. Examples of system health can include, but are not limited to, configuration settings, loss of communication, drivers, firmware/hardware updates, data wrapping/loss, etc.

Instrument health can include any aspect of the operation of the sensors 110 to collect sensor data. The condition monitoring system 102 can receive metadata from the sensors 110 regarding their operation and employ this data in conjunction with set points or other programmed logic to determine whether an instrument health event has occurred and should be logged. Examples of instrument health can include, but are not limited to, instrument faults, instrument OK status, and instrument communication status.

Analytical health can include the logic employed for identifying events (e.g., alarms and additional monitoring). As an example, rules/criteria defining when the condition monitoring system 102 logs an event (e.g., an event source) can be prepared by one or more authorized parties, such as a manufacturer, owner, operator of the condition monitoring system. The condition monitoring system 102 can receive metadata regarding logic employed for event identification and employ this data in conjunction with predetermined set points or other criteria defining normal and abnormal operation of event identification logic determine whether an event has occurred and should be logged. Examples of analytical health can include, but are not limited to presence/absence of event identification logic.

In general, regardless of the event type, when an event is logged, selected event data regarding that event can be recorded. Examples of event data can include, but are not limited to, a location of the affected asset within the asset hierarchy of the fleet, and at least one event parameter corresponding to the event (e.g., an operating parameter measurement in the case of an alarm event). The event parameters can optionally include one or more of the following, in any combination:

Event name: A name of the identified event.

Asset state: An operating state of the asset to which the event pertains. Examples can include, but are not limited to, startup, running (normal operation), shutdown, etc.

Measurement type and measurement point: The measurement type is the category of measurement used to identify the event (e.g., vibration, temperature, pressure, etc.) The measurement point is a channel used to acquire the values for the measurement type (e.g., the sensor(s) 110).

Event Trigger: One or more set points used to identify the event.

Event type: A classification of the event (e.g., NOT OK, over, under, etc.),

Event source: One or more logic packages employed to identify an event. Such logic packages can be received from a variety of sources, including but not limited to, manufacturers, owners, and/or operators of the condition monitoring system.

Event time: A time or time duration at which the event occurred (e.g., entered time, exited time, etc.)

Event level: A relative measure of priority of the event. The event level can be determined by the condition monitoring system 102 after an event has been identified.

Event parameter measurement(s): The operating parameter measurement(s) used to identify the event. When the event is transitory, the operating parameter measurement(s) can be a single operational parameter measurement(s) Alternatively, when the event persists, the operating parameter measurement(s) can be a plurality of operating parameter measurements acquired during at least a portion of the event (e.g., operational parameter measurements acquired between the event entered time and the event exited time)

Each condition monitoring system 102 can be configured to output the event data logged for assets 106 of its respective site. In certain embodiments, as shown in FIG. 1, the event visualization system 104 can be in communication with the plurality of condition monitoring systems 102 and the event data can be received therefrom (e.g., site 1 event data 112A, site N event data 112N, collectively event data 112). In alternative embodiments, not shown, the condition monitoring system can output the event data to another computing device. Subsequently, the condition monitoring system can retrieve the event data.

As shown, the event visualization system 104 includes an event analyzer 116 in communication with a historian 120, and a user computing device 122. The historian 120 can be a computing device configured to store event data 112 corresponding to respective events that is acquired by the plurality of condition monitoring systems 102 (e.g., a memory device). The historian 120, or another memory device in communication with the event analyzer 116 can also store at least one cost 112' corresponding to respective ones of the events.

The event analyzer 116 can be a computing device including at least one processor, and it can be configured to submit queries 114 to the historian 120, and/or queries 114' to other memory devices, for the event data 112 and the at least one cost 112'. Subsequently, the event analyzer 116 can generate graphical user interfaces (GUIs) 126 based upon the received event data 112 and costs 112', and transmit the GUIs 126 to the user computing device 122 for display. The user computing device 122 can be configured to display GUIs 126 generated by the event analyzer 116, as well as receive user selections within the GUI 126.

A hierarchical list of the assets within the fleet (e.g., a first list), arranged in levels as discussed above, can be displayed within the GUI 126. In response to receipt of a user selection of a hierarchical level within this first list, the event analyzer 116 can be configured to identify a plurality of events associated with the selected hierarchical level. The event analyzer 116 can be further configured to update the GUI 126 to include a second list of the identified events. In this second list, unique and repeated events can each be displayed in its own respective, single entry. In certain embodiments, a cost corresponding to events of the second list can also be presented.

In a further aspect, the GUI 126 can be updated to display detailed data regarding an event of the second list in response to an operator selection. As discussed in detail below, the detailed data can include any of the event data 112. Examples can include, but are not limited to, one or more of a most recent occurrence of the selected event, at least one recommendation regarding the selected event, all occurrences of the selected event, or measured operating data regarding the selected event. In further embodiments, the detailed data can include one or more possible causes of the selected event and corresponding costs. In contrast, existing condition monitoring systems can lack the ability to obtain and display such detailed event data, or at the very least, can require an operator to switch between multiple applications. The ability to view detailed event data without cumbersome application switching can further improve the efficiency of operators employing the event visualization system 104.

The event visualization system 104 can provide a variety of benefits over existing techniques for event visualization. In one aspect, events from a plurality of condition monitoring systems 102 can be included in the event data 112 and visualized. In contrast, existing condition monitoring systems can be configured to only visualize event data acquired at their local site and cannot visualize events experienced by assets of other sites. The ability to aggregate repeated events can also improve the efficiency of operators employing the event visualization system 104, as repeated events can be reviewed together without the need for additional searching. Similarly, the ability to view costs corresponding to respective events can also improve the efficiency of operators employing the event visualization system, as the costs can be used to prioritize attention directed events and speeding up the process of making decisions regarding disposition/resolution of events.

In certain embodiments, events can pertain to alarms (e.g., an operating parameter that is outside of a normal operating range). Under some circumstances, an alarm can be indicative of a problem with the monitored asset, and it can be desirable to address such alarms in order to avoid asset shutdown and/or damage. Accordingly, the GUI 126 can be further updated to display one or more recommended actions in combination with an alarm event. In further embodiments, costs corresponding to respective recommended actions can also be displayed. Beneficially, by displaying recommendations in combination with alarm events and/or costs corresponding to respective recommendations, the event visualization system 104 can assist operators in determining courses of action to address an alarm events and allow faster resolution of such alarm events.

Aggregated Event Display

Figure 2:
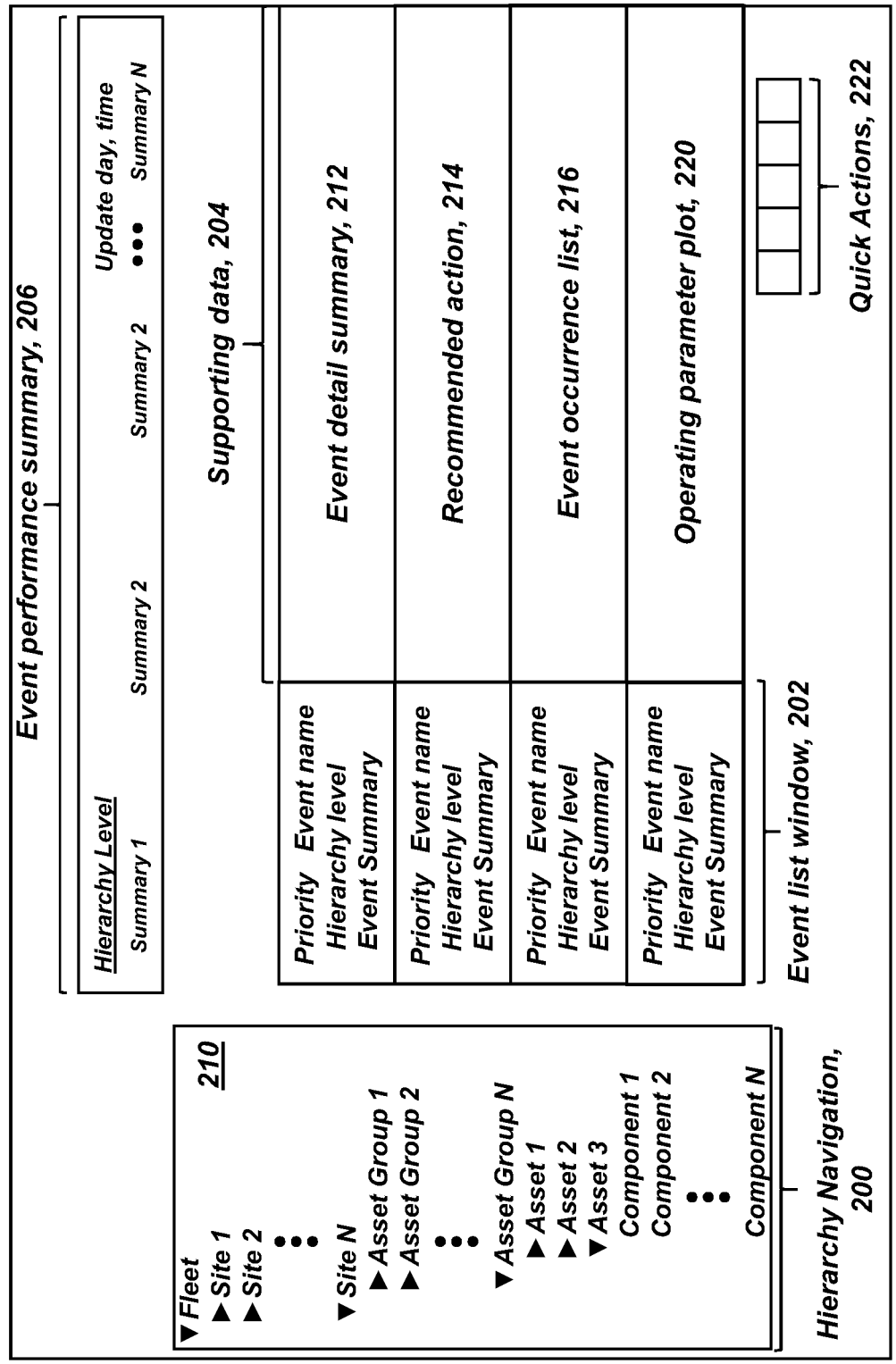
FIG. 2 is a schematic diagram illustrating one exemplary embodiment of a graphical user interface (GUI) generated by the event analyzer of FIG. 1 including a first window (e.g., 202) presenting a hierarchical list of assets of a fleet (e.g., fleet level, site level, group level, machine/component level, etc.) and a second window (e.g., 204) listing unique events and aggregated recurring events occurring within a selected level within the hierarchical list, and a third window providing detailed supporting data regarding an event selected from the second window.

The discussion below provides exemplary embodiments of the GUI 126 generated by the event analyzer 116 with regards to FIGS. 2, 3A, and 3B. FIG. 2 is a schematic diagram illustrating one exemplary embodiment of the GUI 126 configured to aggregate repeated events. As discussed in detail below, the GUI 126 can be configured to display one or more of a first window 200, a second window 202, a third window 204, and a fourth window 206 in any combination.

The GUI 126 can be configured to display a hierarchical list of assets 210 within the first window 200 (a hierarchy navigation window). As shown, the hierarchical list of assets 210 includes a plurality of levels, such as a fleet level, a site level, an asset group level, an asset level, and a component level.

The GUI 126 can be configured to receive a user selection (e.g., user selection 124) of a level of the hierarchical list of assets 210. In response to receipt of this selection, the event analyzer 116 can determine the assets 106 and corresponding events associated with the selected hierarchical level.

As discussed above, the highest level is the fleet level. Thus, selection of the fleet level includes all assets 106 of the fleet (e.g., all assets within each site) and all events of the fleet.

The second highest level is the site level and it can include one or more sites (e.g., site 1, site 2, . . . site N). Thus, selection of a site of the site level can include the assets 106 associated with the selected site and all events corresponding to the assets of the selected site.

The third highest level is the asset group level (e.g., asset group 1, asset group 2, . . . asset group N). Thus, selection of an asset group of the asset group level can include the assets 106 associated with the selected asset group and all events corresponding to the assets 106 of the selected asset group.

The fourth highest level is the asset level (e.g., asset 1, asset 2, asset N). Thus, selection of an asset 106 of the asset level includes the selected asset 106 and all events corresponding to the selected asset 106. Optionally, when asset components are monitored, selection of an asset 106 of the asset level can further include the components associated with the selected asset 106 and events corresponding to the selected asset 106.

The fifth highest level is the asset component level (e.g., component 1, component 2, component N). Thus, selection of a component of the component level includes the selected component and all events corresponding to the selected component.

The event analyzer 116 can be further configured to update the GUI 126 to display a second list of events associated with the selected hierarchical level of the hierarchical list of assets 210. This second list can include a single entry for unique events and a single entry for respective repeat events. As discussed above, examples of events can include, but are not limited to, alarms, system health of the condition monitoring system, instrument health of instruments (e.g., sensors 110) acquiring operating parameter measurements of respective monitored assets 106, and analytical health of logic used to identify the events.

As discussed above, the event data corresponding to each event can include at least one event parameter. In certain embodiments, an event can be classified as a repeat event when the at least one event parameter corresponding to the event matches all of the at least one event parameter of another event of the plurality of events. In general, such matching is designed to ensure that events classified as repeat events are evaluated on the same basis and occur under nominally identical conditions of the asset and, therefore, can be attributed to the same underlying cause. Furthermore, such events can exhibit little substantive variation with respect to one another. Therefore, grouping these repeat events in a single entry within the second list provides a significant efficient improvement without a substantive loss of event information.

In certain embodiments, the at least one event parameter can include measurement type and measurement point, asset state, event level, event source, and event type. Thus, under these circumstances, an event is classified as a unique event when the at least one of the above-listed event parameters of the event does not match another event. In contrast, under these circumstances, an event is classified as a repeat event when the least one event parameter corresponding to the event matches all of the above-listed event parameters of another event.

It can be appreciated that these event parameters are discussed for the purpose of example only and the at least one event parameter can be different and, optionally, can include greater or fewer event parameters.

In further embodiments, the second window 202 (an event list window) can further display selected event information corresponding to each of the listed events. As an example, as shown in FIG. 2, the event information includes the event priority, event name, hierarchy level, and an event summary.

The GUI 126 can be further configured to receive a second user selection of an event within the list displayed in the second window 202. In response to receipt of this selection, the event analyzer 116 can be configured to update the GUI 126 to display the third window 204 including at least a portion of the event data 112 that corresponds to the selected event. Examples of the event data can include, but are not limited to, an event summary 212, a recommended action 214, an event occurrence list 216, and an operating parameter plot 220.

Figure 3A:
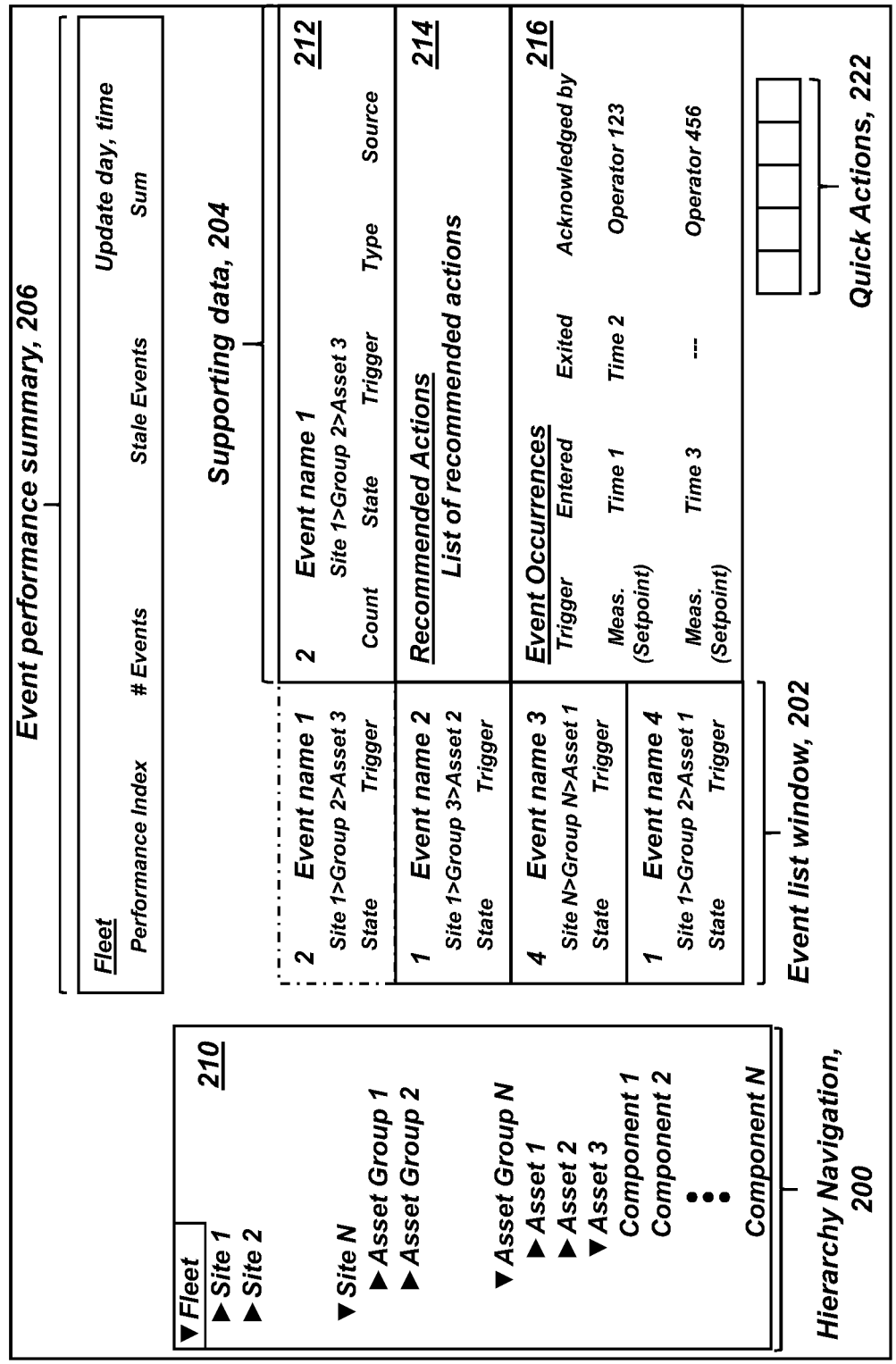
FIG. 3A is a schematic diagram illustrating the GUI of FIG. 2 after selection of a hierarchical level from the list in the first window and an event from the list in the second window.
Figure 3B:
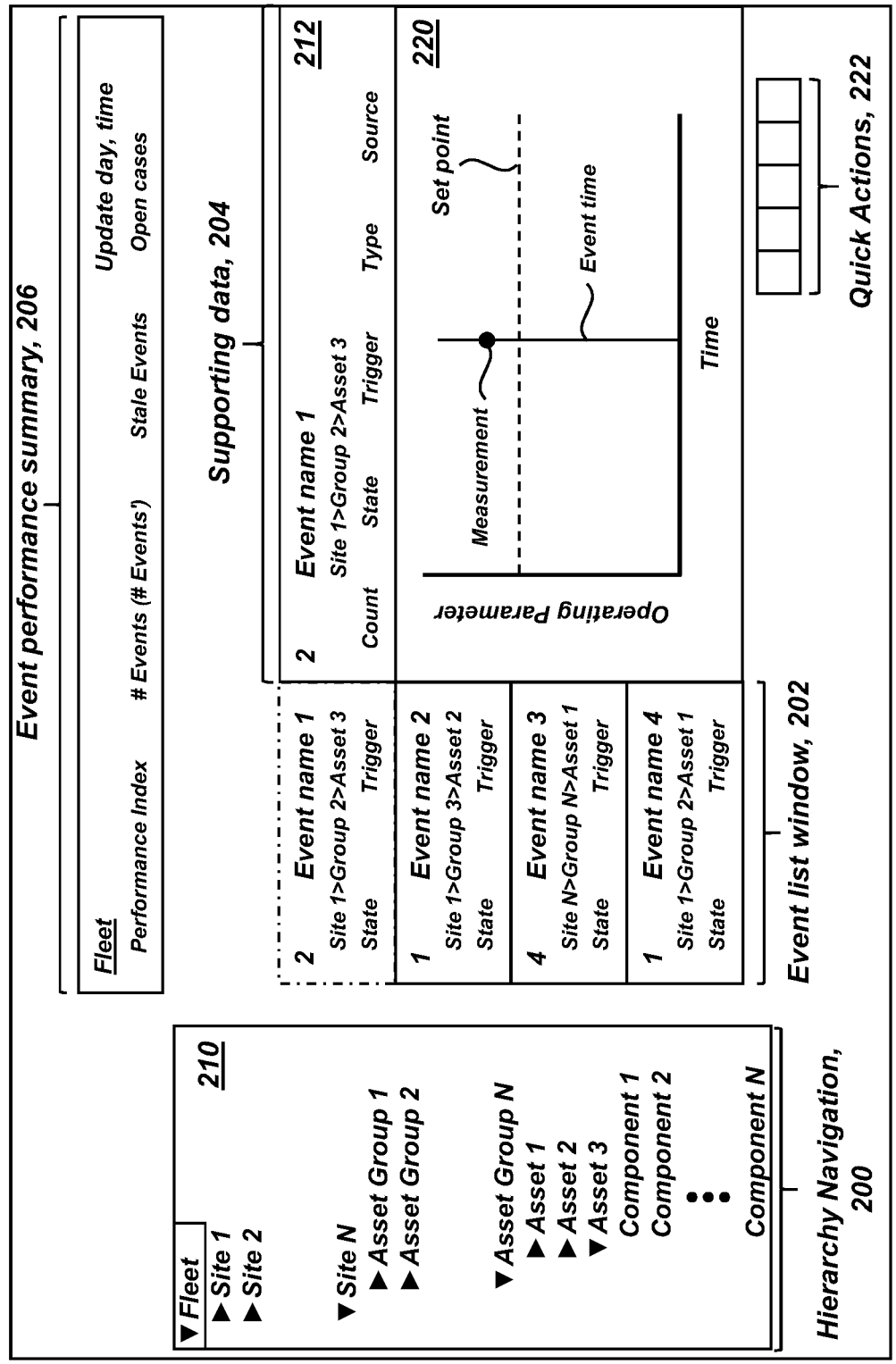
FIG. 3B is a schematic diagram illustrating the GUI of FIG. 3 further including a plot of one or more operating parameter measurements corresponding to the event selected in the second window.

A representative example is further illustrated FIGS. 3A-3B. As shown, the fleet hierarchy level is selected within the first window 200 and corresponding events are illustrated in the second window 202. The "Event name 1" is the event further selected within the second window 202. An exemplary event detail summary 212 is shown in a first sub-window of the third window 204. As an example, the priority, event name, and the position of the selected event within the asset hierarchy of the fleet is further illustrated.

Embodiments of further event data summarized in the event detail summary 212 can be based upon the most recent occurrence of the event. Non-limiting examples of summarized event data can include, but is not limited to, an event occurrence count, the asset state (startup, running (normal operation), shutdown, etc.), the event trigger value (alone or in combination with a measured operating parameter value causing the event to be triggered), the event type (e.g., alarm, system health, instrument health, or analytical health), and the event source. In the case of a uniquely selected event, the most recent occurrence will be the only occurrence within the event data corresponding to the selected event. Thus, under these circumstances, the count adopts a value of 1.

In certain embodiments, recommended actions are shown in a second sub-window of the third window 204. The recommended actions corresponding to respective events can be determined by the condition monitoring system 102 and included with the event data 112. In certain embodiments, the recommendations can be determined by the condition monitoring systems 102 and provided with the event data 112. In other embodiments, an operator can employ the event visualization system 104 to associate recommendations with specific events. In one example, a recommendation can suggest that specific maintenance be performed on an asset 106. In another example, a recommendation can suggest operation of an asset 106 within specified operating parameters.

An exemplary list of event occurrences 216 is shown in a third sub-window of the third window 204. In the case of a uniquely selected event, the most recent occurrence will be the only occurrence within the event data corresponding to the selected event. Thus, under these circumstances, only a single occurrence will be displayed. In contrast, the case of a repeat selected event, all of the occurrences within the event data corresponding to the selected repeat event can be displayed.

For each occurrence, selected event data can be displayed. As shown in FIG. 3A, the event data can include event parameters such as trigger. As an example, the event occurrence list 216 can include the event trigger value (alone or in combination with a measured operating parameter value causing the event to be triggered), event entry (start) and exit (stop) times, and, optionally, an operator acknowledgement of the selected event (e.g., via a quick action, discussed in greater detail below).

In certain embodiments, a plot of one or more measured operating parameters of the asset 106 as a function of time is shown in a fourth sub-window of the third window 204. As shown, the measured operating parameter(s) can include one or more operating parameter measurements acquired before, during, and/or after the selected event. Optionally, one or more set points can be overlaid on the plot. It can be appreciated that the plot can display other data in any format as necessary.

The event analyzer 116 can be further configured to update the GUI 126 to display a fourth window 206 in response to receipt of the first user selection of a level of the hierarchical list of assets 210. As an example, the fourth window 206 can include a performance summary at the selected hierarchy level based upon the portion of the event data 112 corresponding to the first plurality of events.

A representative example of the fourth window is further illustrated FIGS. 3A-3B. Continuing the example above, the fleet hierarchy level is selected within the first window 200 and a corresponding summary of the assets of the fleet hierarchy level is illustrated in the second window 202. As shown, the performance summary includes a performance index, a number of events (alone or in combination with a number of unacknowledged events), a number of stale events (e.g., events that have gone without acknowledgement for a predetermined amount of time), and the like.

In additional embodiments, the event analyzer 116 can be further configured to include user interface objects 222 corresponding to one or more quick actions within the generated GUI 126. The functionality of the user interface objects 222 can adopt a variety of configurations. In one embodiment, quick actions can pertain to alarm management. Examples can include, but are not limited to, alarm acknowledgement, alarm suppression, resetting a latched alarm, etc. In a further embodiment, quick actions can pertain to case management, such as case creation or case assignment. As an example, under circumstances where an operator has a case where they are managing the status/maintenance of a specific asset 106 and a new event is identified that is related to the case, the operator can use the quick actions to assign that event to the case to gather all supporting data. In another example, a new case could be created after a new event is identified. In a further embodiment, quick actions can pertain to navigation within the GUI 126. (e.g., the operating parameter plot 220). Beneficially, the ability to create and deploy quick actions enables a degree of customization of the GUI 126 and can facilitate better operator experiences.

It can be appreciated that discussion of the event parameters and corresponding summaries for display within the GUI 126 is presented solely for the sake of example, and the event parameters can be different from those illustrated and, optionally, can include greater or fewer event parameters.

Figure 4:
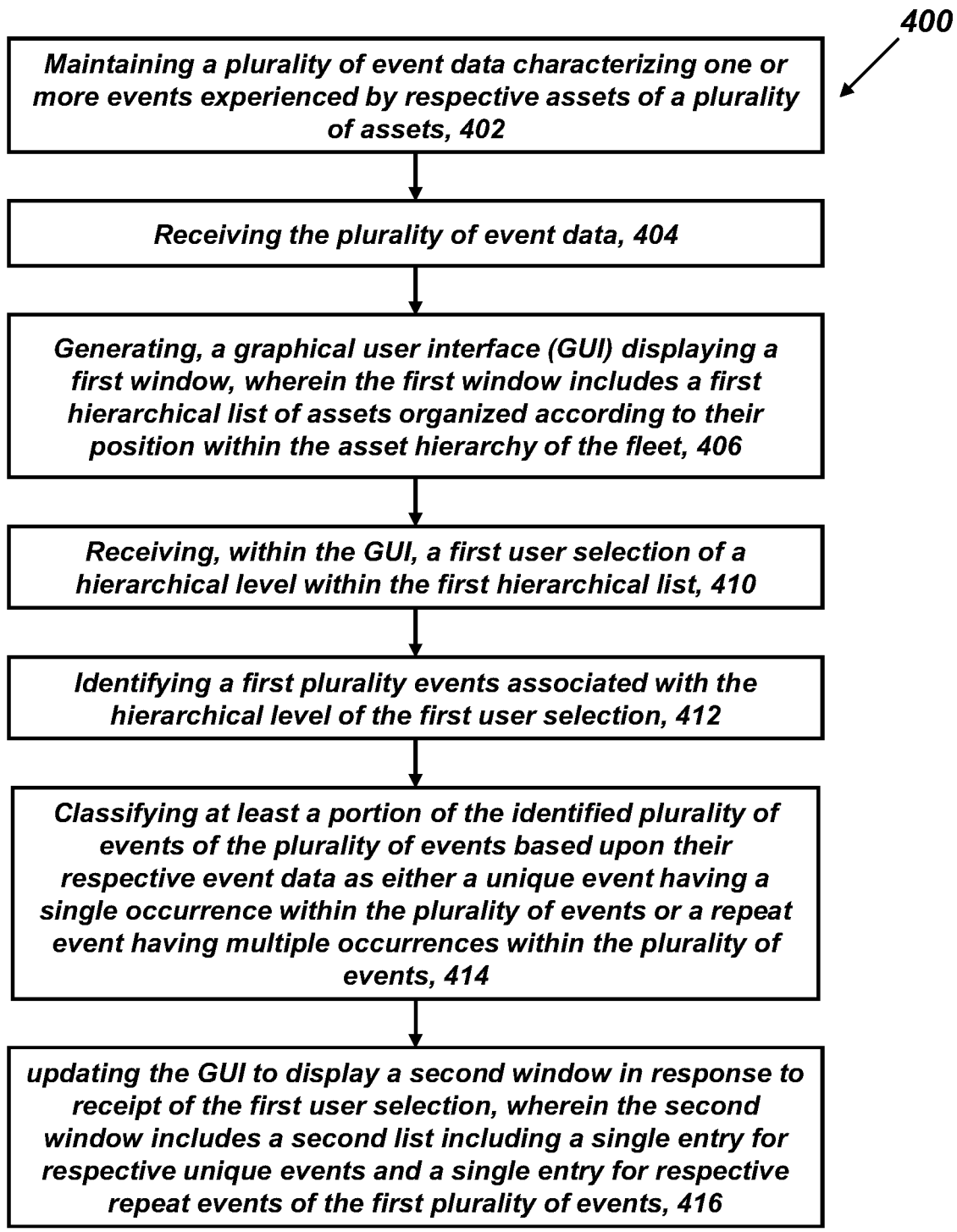
FIG. 4 is a flow diagram illustrating one exemplary embodiment of a method for visualization of events for condition monitoring.

FIG. 4 is a flow diagram illustrating one exemplary embodiment of a method 400 for improved visualization of events for condition monitoring. As shown, the method 400 includes operations 402-416 and are discussed below with respect to FIGS. 1-3B. It can be appreciated that, in alternative embodiments, the method can include greater or fewer operations and/or performed in a different order than illustrated in FIG. 4.

In operation 402, a plurality of event data (e.g., event data 112) characterizing one or more events experienced by respective assets of the plurality of assets 106 can be maintained (e.g., by the event visualization system 104). In an embodiment, the event data 112 can be maintained by the historian 120. The plurality of assets 106 can be distributed among different sites of a fleet. In an embodiment, an event can be at least one of an alarm, a condition monitoring system health event, an instrument health event, and an analytical health.

The event data can include at least a location of the selected asset 106 within an asset hierarchy of the fleet and at least one event parameter corresponding to the event. In an embodiment, the at least one event parameter can include at least one of a measurement type, a measurement point, an event type, an event level, an event source, and an asset state. In further embodiments, the event data can include measured operating data (e.g., measured operating parameters) related to respective events. As an example, the measured operating data can be one or more operating parameters measured at about the same time, before, and/or after respective events.

In operation 404, the plurality of event data can be received by one or more processors (e.g., the event analyzer 116).

In operation 406, the event analyzer 116 can generate a graphical user interface (GUI) 126 displaying the first window 200. The first window 200 can include a hierarchical list of assets organized according to their position within the asset hierarchy of the fleet. As an example, the asset hierarchy of the fleet can include two or more of a fleet level, a site level, an asset group level, and an asset level.

In operation 410, a first user selection of a hierarchical level within the hierarchical list can be received by the event analyzer 116. As an example, the GUI 126 an operator can view the GUI 126 and provide the first user selection with the user computing device 122. The user computing device 122 can be in communication with the event analyzer 116 (e.g., via a network) and transmit the first user selection to the event analyzer 116 upon entry.

In operation 412, the event analyzer 116 can identify a plurality events associated with the hierarchical level of the first user selection.

In operation 414, the event analyzer 116 can classify at least a portion of the identified plurality of events based upon their respective event data. In certain embodiments, all of the identified plurality of events can be classified. As an example, events can be classified as either a unique event having a single occurrence within the plurality of events or a repeat event having multiple occurrences within the plurality of events.

In one embodiment, an event can be classified by the event analyzer 116 as a unique event when the at least one event parameter corresponding to the event does not match another event of the plurality of events. In another embodiment, an event can be classified by the one or more processors as a repeat event when the least one event parameter corresponding to the event matches all of the at least one event parameter of another event of the plurality of events.

In operation 416, the event analyzer 116 can update the GUI 126 to display the second window 202 in response to receipt of the first user selection. The second window 202 can include a second list including a single entry for respective unique events and a single entry for respective repeat events of the first plurality of events.

In additional embodiments, a second user selection of an event from the second list can be received within the GUI 126. In response to receipt of the second user selection, the event analyzer 116 can update the GUI 126 to display at least one third window 204. The third window 204 can include event data corresponding to the selected event.

The third window 204 can adopt a variety of configurations. In one embodiment, the third window 204 can be in the form of first sub-window (e.g., event detail summary 212) that displays a most recent occurrence of the selected event including a first portion of the at least one event parameter.

In another embodiment, the event data can further include at least one recommendation. Under this circumstance, the third window 204 can be in the form of the second sub-window (e.g., recommended action 214) displaying the at least one recommendation.

In a further embodiment, the third window 204 can be in the form of the third sub-window (e.g., event occurrence list 216) displaying all occurrences of the selected event and including respective second portions of the at least one event parameter for each occurrence.

In an additional embodiment, the third window 204 can be in the form of the fourth sub-window (e.g., operating parameter plot 220) including a plot of the measured operating data. The measured operating data can be before, during, and/or after the selected event.

Event Cost Display

The discussion below provides alternative embodiments of the GUI 126 generated by the event analyzer 116 with regards to FIGS. 5-6. A corresponding flow diagram illustrating one exemplary embodiment of a method 700 for improved visualization of events for condition monitoring including display of costs corresponding to respective events. As shown, the method 700 includes operations 702-714, and are discussed below with respect to FIGS. 1 and 5-6. It can be appreciated that, in alternative embodiments, the method can include greater or fewer operations and/or performed in a different order than illustrated in FIG. 7.

In operation 702, a plurality of event data (e.g., event data 112) characterizing one or more events experienced by respective assets of a plurality of assets can be maintained, by a memory, along with at least one cost (e.g., 112') corresponding to respective ones of the one or more events. As discussed above, the plurality of assets can be are distributed among different sites of a fleet, and the event data can include at least a location of the asset within an asset hierarchy of the fleet and at least one event parameter corresponding to the event.

In certain embodiments, the at least one cost can be represented as an amount of currency. In another aspect, the at least one cost can be represented as a unitless value (e.g., normalized by a currency amount). The at least one cost can be maintained in the historian 120 or another data storage device. The at least one cost can be received by the event analyzer 116 in response to a query of the historian (e.g., query 114) or in response to a query of another data storage device (e.g., query 114').

The at least one cost can be configured to represent one or more of variety of considerations, alone or in combination. In one aspect, the at least one cost can represent a financial cost to resolve an event, such as repair or replacement of an asset (e.g., materials, labor, etc.) In other aspects, the at least one costs can represent a financial cost associated with an event but not pertaining directly to the monitored asset itself, such as environmental mitigation, worker health and safety, fines assessed for breach of contractual obligations, fines assessed for breach of regulatory requirements, insurance costs, legal costs, or any combination thereof.

In further aspect, the cost can reflect interdependencies between respective assets. That is, an event associated with one asset may have an influence upon another asset. For example, the monitored asset may be a cooling system for another asset. When the event involves reduced performance, shutdown, or catastrophic failure of the monitored asset, the other asset can also be implicated. Thus, the cost corresponding to an event for a first monitored asset can further include the cost of any events occurring in other assets due to occurrence of the event of the first monitored asset.

It can be appreciated that this list of costs is not exhaustive and the at least one cost can include any cost relevant to an event, as necessary.

The at least one cost can be represented in a variety of ways. It can be appreciated that there can be one or more possible causes of an event, and each of these causes can have an associated cost. Thus, the at least one cost can be a plurality of costs, each of the plurality of costs corresponding to a respective possible event cause. In one aspect, the at least one cost can be the highest cost amongst the costs of the respective possible event causes. In another aspect, the at least one cost can be an average of the costs of a portion of the possible events (e.g., the possible events with the top five highest costs) or an average of all of the costs of the possible events. Other representations of the costs can be employed without limit.

The values of the one or more costs can be determined in a variety of ways, alone or in combination. In one aspect, the cost of an event or a specific event cause can be determined based upon historical, incurred costs for identical or similar events. In another aspect, the cost of an event or specific event cause can be determined based upon operational data and one or more appropriate models. From the forgoing, it can be appreciated that developing estimates of the one or more costs can involve a variety of considerations

- Working through the production processes at a site containing the monitored assets.
- Understanding the impact of each asset failure on the production process.
- Building reliability block diagrams to quantify the relationship between respective assets.
- Optimizing the maintenance, secondary actions, and on-hand equipment to sustain the production process.
- Capturing these considerations in reliability models and optimizing such reliability models to find an appropriate level of maintenance, based upon the operator's risk tolerance and availability needs.

An example of one such model is a reliability model developed based upon Failure Modes and Effects Analysis (FMEA). It can be appreciated, however, that other financial models may be employed without limit. These models and outputs can be related to potential failure of a particular asset to quantify the cost as an amount of currency or a unitless value (e.g., normalized by an amount of currency).

The at least one cost can be stored in the historian 120, another other memory device, or combinations thereof). When represented as an amount of currency, the GUI 126 can display the cost in a default currency (e.g., U.S. dollars) or as an amount converted from the default currency to another predetermined currency (e.g., as specified by the operator, as specified by a localization setting of the event visualization system 104, etc.) As necessary, currency conversion may be performed by the event analyzer 116 using a predetermined exchange rate (e.g., a foreign exchange rate published by a designated authority, such as a central bank).

In operation 704, the event analyzer 116 can receive the plurality of event data and the at least one cost corresponding to respective ones of the one or more events.

Figure 5:
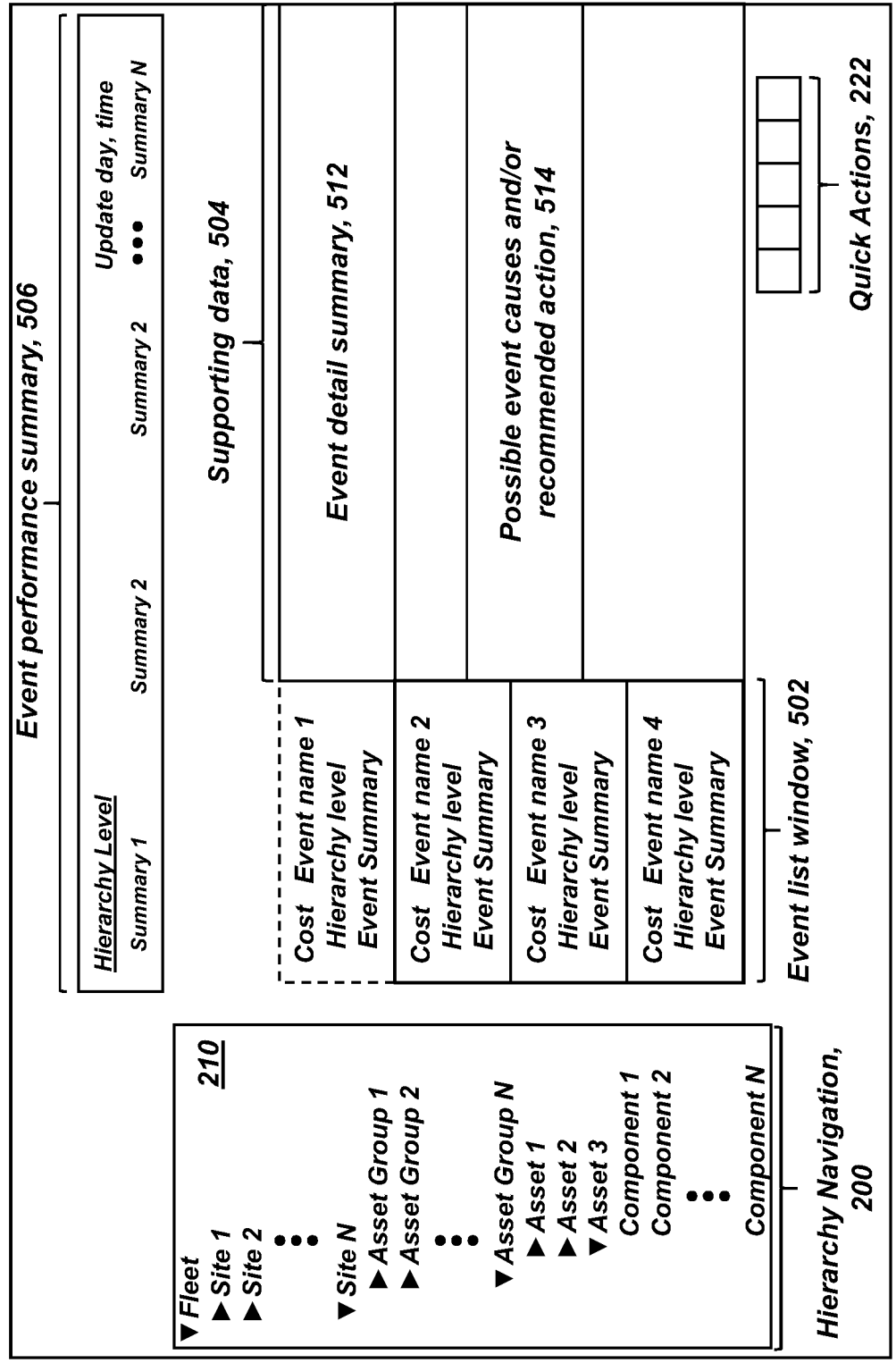
FIG. 5 is a schematic diagram illustrating another exemplary embodiment of a GUI including a second window listing events and corresponding costs, and a third window providing detailed supporting data regarding an event selected from the second window.

In operation 706, the event analyzer 116 can generate GUI 126, as illustrated in FIG. 5. As discussed in detail below, the GUI 126 can be configured to display one or more of the first window 200, a second window 502, a third window 504, and a fourth window 506 in any combination.

The first window 200 (e.g., the hierarchy navigation window) of the GUI 126 can be the same as that discussed above with regards to FIG. 2, configured to display the hierarchical list of assets 210. As shown, the first window 200 includes the hierarchical list of assets 210, organized according to their position within the asset hierarchy of the fleet.

In operation 710, the event analyzer 116 can receive, via the GUI 126, the first user selection (e.g., user selection 124) of a level from the hierarchical list of assets 210. In operation 712, the event analyzer 116 can further identify the assets 106 and corresponding events associated with the selected hierarchical level. These operations 710, 712 can be performed as discussed above with respect to operations 410, 412 of the method 400.

Examples of events can include, but are not limited to, alarms, system health of the condition monitoring system, instrument health of instruments (e.g., sensors 110) acquiring operating parameter measurements of respective monitored assets 106, and analytical health of logic used to identify the events.

In operation 714, the event analyzer 116 can update the GUI 126 to display a second window 502 (the event list window) in response to receipt of the first user selection. In certain embodiments, as discussed above in the context of FIG. 2, this second list can include a single entry for unique events and a single entry for respective repeat events. In other embodiments, this second list can omit aggregation of repeat events and instead list every event associate with the selected hierarchical level.

The second window 502 can further display selected event information corresponding to each of the listed events, as well as the at least one cost corresponding the respective listed events. As an example, as shown in FIG. 5, the event information includes the event name, the hierarchy level, and the event summary.

In contrast to the embodiment of FIG. 2, the GUI 126 of FIG. 5 can replace the priority with the at least one cost. In alternative embodiments, not shown, the priority can be shown in combination with the at least one cost.

As discussed above, an event can have one or more corresponding possible causes. Accordingly, the at least one cost shown in the second window 202 for a given event can be representative of the cost of the corresponding possible causes. In one example, the at least one cost can be a highest cost of the costs of the corresponding possible causes. In another example, the at least one cost can be an average of all of, or a selected portion of, the costs of the corresponding possible causes. In this manner, the operator can readily view a cost that is representative of the corresponding possible causes of the event, without needing to view the individual causes themselves. That is, the second window 202 provides a convenient summary of the cost corresponding to a respective event.

In further embodiments, more than one cost corresponding to a respective event can be displayed. Examples can include, but are not limited to, a highest cost and a lowest cost of the corresponding possible causes, a highest cost and an average cost (of all or a portion of) the corresponding possible causes, and the like.

The GUI 126 can be further configured to receive a second user selection of an event within the list displayed in the second window 202. In response to receipt of this selection, the event analyzer 116 can be configured to update the GUI 126 to display the third window 204 (supporting data) including at least a portion of the event data 112 that corresponds to the selected event. Examples of the event data can include, but are not limited to, the event detail summary 212, the recommended action 214, the event occurrence list 216, and the operating parameter plot 220, as discussed above with respect to FIG. 2.

In further embodiments, the third window can take the form of a third window 504. In one aspect, the third window 504 can include the event detail summary 212 in the form of event detail summary 512 and a list 514 of the respective causes of the possible event causes and corresponding costs for a selected event.

Figure 6:
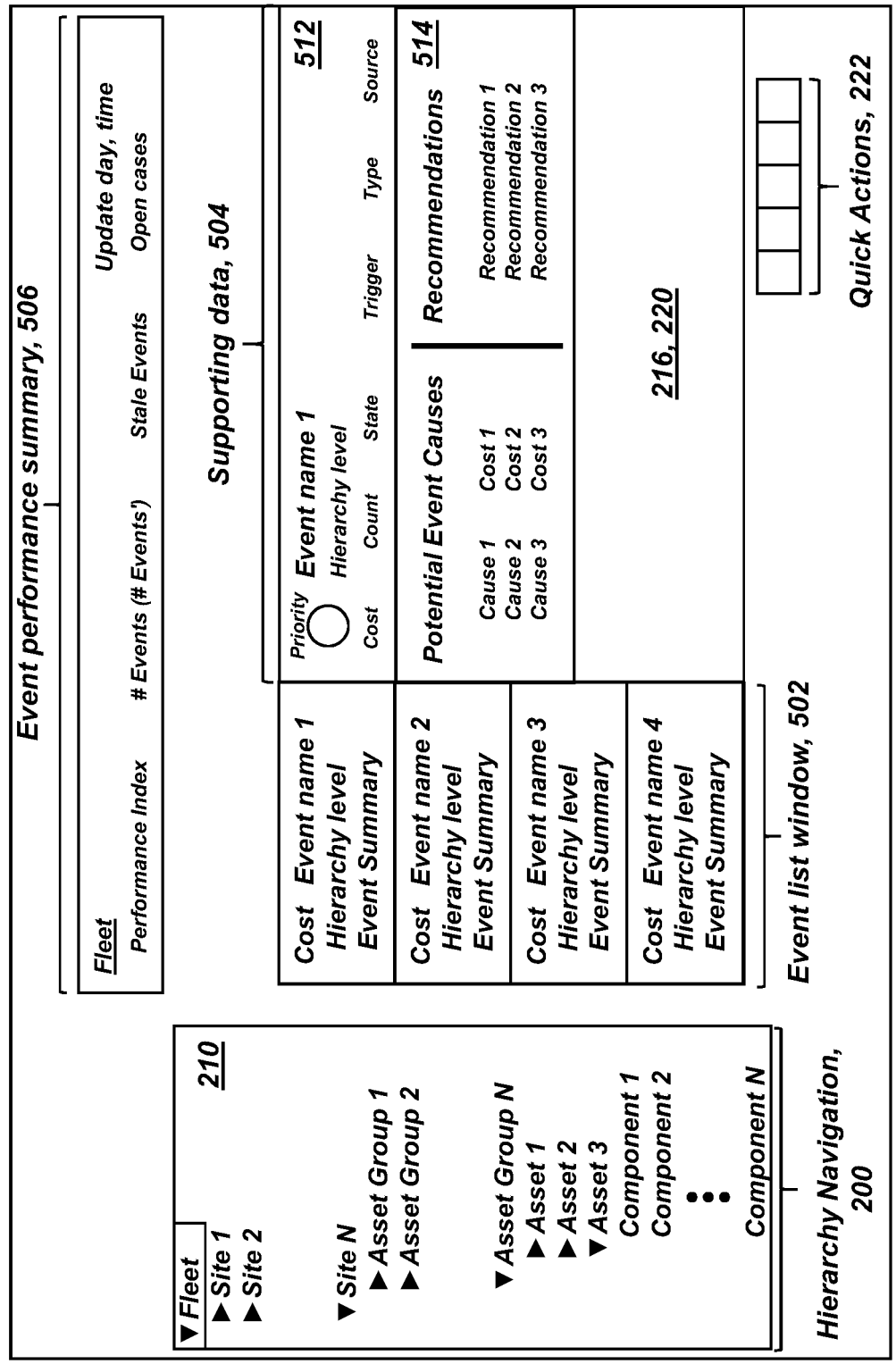
FIG. 6 is a schematic diagram illustrating another exemplary embodiment of FIG. 5 after selection of a hierarchical level from the list in the first window and an event from the list in the second window.
Figure 7:
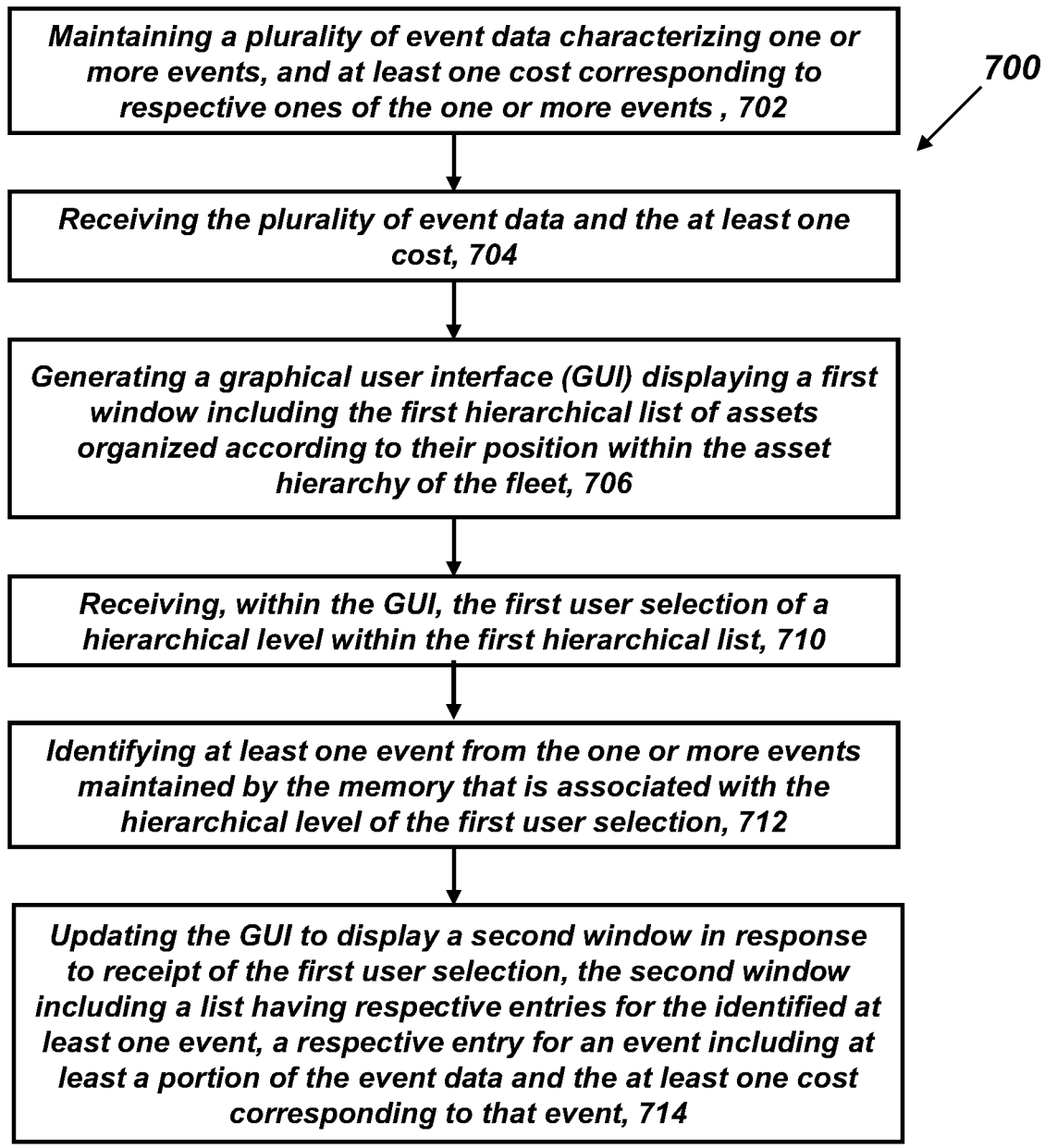
FIG. 7 is a flow diagram illustrating one exemplary embodiment of a method for visualization of events and corresponding costs for condition monitoring.

A representative example is illustrated in FIG. 6. As shown, the fleet hierarchy level is selected within the first window 200 and corresponding events are illustrated in the second window 502. The "Event name 1" is the event further selected within the second window 502. An exemplary event detail summary 512 is shown in a first sub-window of the third window 504. As an example, the event cost, event priority, event name, and the position of the selected event within the asset hierarchy of the fleet is further illustrated.

Embodiments of further event data summarized in the event detail summary 512 can be based upon the most recent occurrence of the event. Non-limiting examples of summarized event data can include, but is not limited to, an event occurrence count, the asset state (startup, running (normal operation), shutdown, etc.), the event trigger value (alone or in combination with a measured operating parameter value causing the event to be triggered), the event type (e.g., alarm, system health, instrument health, or analytical health), and the event source. In the case of a uniquely selected event, the most recent occurrence will be the only occurrence within the event data corresponding to the selected event. Thus, under these circumstances, the count adopts a value of 1.

The list 514 of potential event causes and corresponding costs, as well as recommendations are shown in a second sub-window of the third window 204. Optionally, recommended actions corresponding to respective event cause can be further displayed with the potential event causes. In one embodiment, the event causes corresponding to an event and recommendations corresponding to an event cause can be determined by preprogrammed logic. For example, respective events, event causes, and recommendations can be maintained in a relational database. After an event is identified, this database can be queried to determine the possible event causes and recommendations. In one example, a recommendation can suggest that specific maintenance be performed on an asset 106. In another example, a recommendation can suggest operation of an asset 106 within specified operating parameters.

As discussed above, the event analyzer 116 can further update the GUI 126 to display the fourth window 206 in response to receipt of the first user selection of a level of the hierarchical list of assets 210, as discussed above. In additional embodiments, the event analyzer 116 can be further configured to include the user interface objects 222 corresponding to one or more quick actions within the generated GUI 126.

Exemplary technical effects of the methods, systems, and devices described herein include, by way of non-limiting example improved visualization of events for condition monitoring. Costs corresponding to respective events identified by a condition monitoring system can be displayed to an operator when viewing the event. The costs can be further specified on the basis of specific possible causes. The costs are based upon analysis of financial impact of respective events, and can better capture the relative significance of an event as compared to existing representations (e.g., priority numbers). Using these costs to assign resources can allow an operator to make resource allocation decisions more rapidly, as well as making resource allocation decisions that are more closely tied to financial impact.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An asset management system comprising:
   a memory configured to maintain:
      a plurality of event data characterizing one or more events experienced by respective assets of a plurality of assets, wherein the plurality of assets are distributed among different sites of a fleet, and wherein the event data includes at least a location of the asset within an asset hierarchy of the fleet and at least one event parameter corresponding to the event;
      at least one cause corresponding to respective ones of the one or more events; and
      at least one cost corresponding to respective ones of the one or more events, the at least one cost comprising a plurality of costs, and a respective cause of the at least one cause corresponds to a respective cost of the plurality of costs; and
   an event analyzer including one or more processors configured to receive the plurality of event data and the at least one cost, and to perform operations comprising:
      generating a graphical user interface (GUI) displaying a first window, wherein the first window includes a hierarchical list of assets organized according to their position within the asset hierarchy of the fleet;
      receiving, via the GUI, a first user selection of a hierarchical level within the hierarchical list;
      identifying at least one event from the one or more events maintained by the memory that is associated with the hierarchical level of the first user selection;
      updating the GUI to display a second window in response to receipt of the first user selection, wherein the second window includes a list having respective entries for the identified at least one event, wherein an entry for an event includes at least a portion of the event data and the at least one cost corresponding to that event;
      receiving, via the GUI, a second user selection of an event from the list within in the second window;
      identifying the at least one cause corresponding to the selected event; and
      updating the GUI to display at least one third window in response to receipt of the second user selection, wherein the third window includes a list having respective entries for the identified at least one cause and its corresponding cost.

2. The asset management system of claim 1, wherein the at least one cost displayed in the second window for an event of the identified at least one event is a highest cost of the plurality of costs for that event.

3. The asset management system of claim 1, wherein the at least one cost displayed in the second window for an event of the identified at least one event is an average of the plurality of costs for that event.

4. The asset management system of claim 1, wherein:
   the memory further comprises a plurality of recommendations and a respective recommendation of the plurality of recommendations corresponds to a respective cause of the at least one cause; and
   wherein the event analyzer is further configured to update the GUI to include the recommendation corresponding to the identified at least one cause within the third window.

5. The asset management system of claim 1, wherein the asset hierarchy of the fleet includes two or more of a fleet level, a site level, an asset group level, or an asset level.

6. The asset management system of claim 1, wherein the at least one event parameter comprises at least one of a measurement type, a measurement point, an event type, an event level, an event source, or an asset state.

7. The asset management system of claim 1, wherein the one or more events comprise at least one of an alarm, a condition monitoring system health event, an instrument health event, or an analytical health event.

8. An method of asset management, comprising:
   maintaining, by a memory:
      a plurality of event data characterizing one or more events experienced by respective assets of a plurality of assets, wherein the plurality of assets are distributed among different sites of a fleet, and wherein the event data includes at least a location of the asset within an asset hierarchy of the fleet and at least one event parameter corresponding to the event; and
      at least one cause corresponding to respective ones of the one or more events; and
      at least one cost corresponding to respective ones of the one or more events, the at least one cost comprising a plurality of costs, and a respective cause of the at least one cause corresponds to a respective cost of the plurality of costs; and
   receiving, by an event analyzer including one or more processors, the plurality of event data and the at least one cost;
   generating, by the event analyzer, a graphical user interface (GUI) displaying a first window, wherein the first window includes a hierarchical list of assets organized according to their position within the asset hierarchy of the fleet;
   receiving, by the event analyzer, within the GUI, a first user selection of a hierarchical level within the hierarchical list;
   identifying, by the event analyzer, at least one event from the one or more events maintained by the memory that is associated with the hierarchical level of the first user selection; and
   updating, by the event analyzer, the GUI to display a second window in response to receipt of the first user selection, wherein the second window includes a list having respective entries for the identified at least one event, wherein an entry for an event includes at least a portion of the event data and the at least one cost corresponding to that event;
   receiving, via the GUI, a second user selection of an event from the list within in the second window;
   identifying the at least one cause corresponding to the selected event; and
   updating the GUI to display at least one third window in response to receipt of the second user selection, wherein the third window includes a list having respective entries for the identified at least one cause and its corresponding cost.

9. The method of claim 8, wherein the at least one cost displayed in the second window for an event of the identified at least one event is a highest cost of the plurality of costs for that event.

10. The method of claim 8, wherein the at least one cost displayed in the second window for an event of the identified at least one event is an average of the plurality of costs for that event.

11. The method of claim 8, further comprising:
   maintaining, by the memory, a plurality of recommendations and a respective recommendation of the plurality of recommendations corresponds to a respective cause of the at least one cause; and updating, by the event analyzer, the GUI to include the recommendation corresponding to the identified at least one cause within the third window.

12. The method of claim 8, wherein the asset hierarchy of the fleet includes two or more of a fleet level, a site level, an asset group level, or an asset level.

13. The method of claim 8, wherein the at least one event parameter comprises at least one of a measurement type, a measurement point, an event type, an event level, an event source, or an asset state.

14. The method of claim 8, wherein the one or more events comprise at least one of an alarm, a condition monitoring system health event, an instrument health event, or an analytical health event.

* * * * *